United States Patent [19]
Hemsath et al.

[11] 3,768,961
[45] Oct. 30, 1973

[54] COMBUSTION APPARATUS
[75] Inventors: Klaus H. Hemsath, Sylvania; Dale E. Wright, Perrysburg, both of Ohio
[73] Assignee: Midland-Ross Corporation, Cleveland, Ohio
[22] Filed: Oct. 19, 1972
[21] Appl. No.: 299,030

Related U.S. Application Data
[62] Division of Ser. No. 193,865, Oct. 29, 1971, Pat. No. 3,718,102.

[52] U.S. Cl. .............................................. 431/278
[51] Int. Cl. ............................................... F23k 5/00
[58] Field of Search ....................... 431/278, 8, 174, 431/187, 284, 285; 110/7 R, 7 S

[56] References Cited
UNITED STATES PATENTS
1,279,315   9/1918   Foerst .............................. 239/419.3
3,244,220   4/1966   Kloecker ......................... 431/284 X
3,601,516   8/1971   Somhegyi et al. ..................... 431/8

Primary Examiner—Edward G. Favors
Attorney—Peter Vrahotes

[57] ABSTRACT
A combustion apparatus for incinerating non-homogeneous pumpable liquid wastes. A watery waste fraction and an oily waste fraction are introduced into a reaction chamber as separate aerosol streams. Combustion air and auxiliary gaseous fuel are used as propellants to produce the aerosol streams. The liquid waste injector includes a central atomizing nozzle for the watery waste liquid fraction and a surrounding annular conduit for auxiliary fuel and combustion air. Around the outside of this first annular conduit is a second annular conduit having a concentrically mounted annular nozzle at the end thereof for producing an aerosol from the oily waste liquid fraction. A high velocity gas stream contacts the oily waste as it is discharged from the nozzle and causes it to flow in a thin sheet over a surface portion of the annular nozzle to an edge thereof where it encounters a second high velocity gas stream directed perpendicularly with respect to the surface. The injector is coaxially mounted on the end of a cylindrical reaction chamber. An annular step is provided at the entrance end of the reaction chamber a short distance downstream from the injector nozzle to shield the chamber surface by preventing wall attachment of the burner flames. A helically swirling annular column of combustion air is supplied around the injector.

4 Claims, 3 Drawing Figures

United States Patent [19]
Hemsath et al.
[11] 3,768,961
[45] Oct. 30, 1973
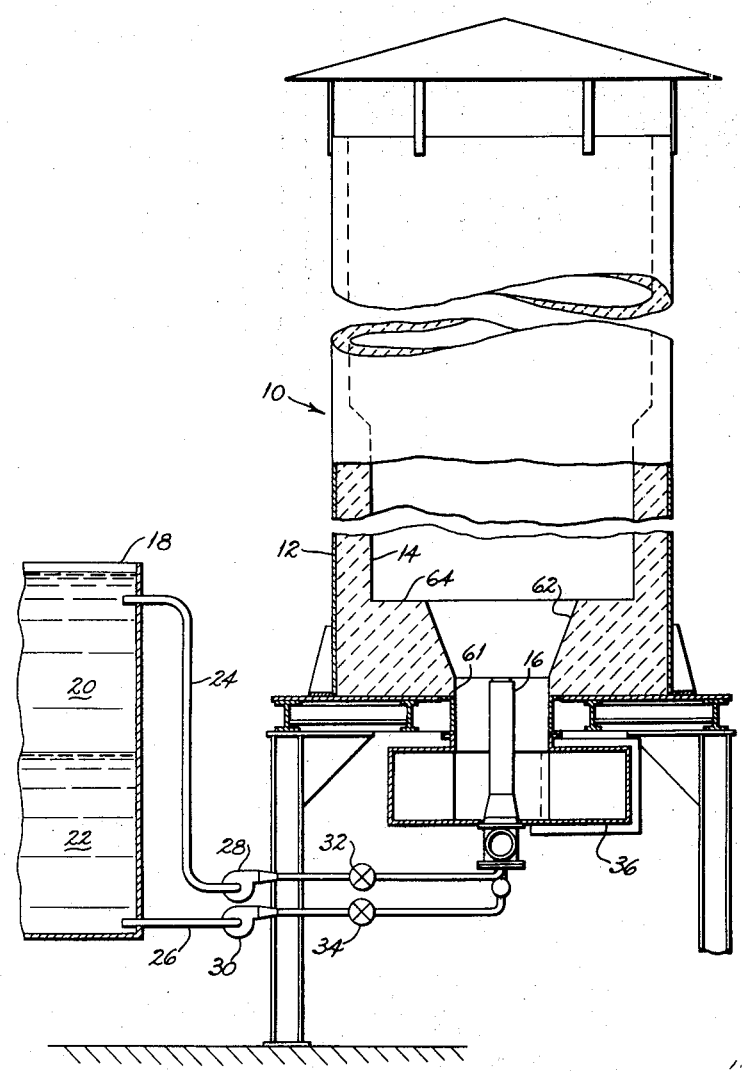

COMBUSTION APPARATUS

This is a division, of U.S. Pat. application Ser. No. 193,865, filed Oct. 29, 1971 and now U.S. Pat. No. 3,718,102.

BACKGROUND OF THE INVENTION

Many devices have been developed for disposing of liquid wastes by combustion processes. Some of these evaporate or distill the liquid wastes until only sludges or solid materials remain and then incinerate the concentrates. When attempts were made to incinerate liquid wastes directly, numerous problems were encountered. One of the primary problems encountered was the difficulty of maintaining a stable flame. Normally the liquid waste was non-homogeneous in character and had a tendency to separate into fractions having widely varying fuel values before reaching the burner nozzle. Emulsifying agents and mixing devices were employed to produce uniformity, but were not completely satisfactory. Another problem was that most unseparated wastes containing high amounts of water were incapable of supporting combustion. As a result, additional fuel was required even though the fuel value of the waste mixture was sufficient for its incineration. The extra fuel was otherwise wasted because its final effect was to drive the flue gas temperature above the required incineration temperature.

Variances in the physical properties, such as viscosity and size of the suspended particles of the waste liquid components also made if difficult to atomize the liquid waste. An atomizer capable of atomizing the highest viscosity component of the liquid waste would be inefficient for the lower viscosity components. Conventional atomizers require relatively minute outlet orifices and are readily clogged by the relatively large suspended particles normally found in liquid wastes. These factors limited the prior art devices to the disposal of refined liquid wastes and also limited the recovery of the heating value from combustible wastes.

SUMMARY OF THE INVENTION

Generally speaking, this invention relates to a combustion apparatus in which two liquid fuels having different fuel values are injected separately into a combustion chamber. More particularly, it pertains to a liquid waste incinerator having means for separating the liquid waste into two fractions and injecting these fractions separately into a mixing and incineration chamber where they are rapidly combined with the necessary quantities of gaseous fuel and combustion air. Preferably the incineration chamber is a refractory lined cylinder with a burner chamber containing a waste liquid injection means at its entrance end. The injection means may include a conventional type atomizer for atomizing the lower viscosity or watery fraction of the liquid waste. The atomizer is aligned with the axis of the incineration chamber. A first annular conduit for supplying gaseous fuel and air surrounds the aforesaid atomizer. A second annular conduit surrounds the first annular conduit and has an annular atomizing nozzle at its distal end. The higher viscosity or oily fraction of the liquid waste is supplied to an annular outlet in an internal head section of the nozzle. The annular nozzle and its internal head section are designed so that a pressurized gas stream flowing around one side of the head contacts the liquid waste and causes it to flow in a thin film across a surface portion of the head. As the thin film reaches the edge of this surface it is contacted by another gas stream flowing around the head from the other side. At the annular line of contact the second gas stream is flowing in a direction substantially perpendicular to the flow direction of the waste liquid film, and in this manner readily breaks the thin film of liquid into fine droplets as it leaves the edge of the surface. Means may be provided to vary the relative volumetric flow rate of the two gas streams. A wind box located at the base of the injection means supplies a helically swirling column of combustion air around the injected fluid streams. The aerosol produced by the annular atomizer is rapidly mixed with this surrounding stream of combustion air. An abrupt offset or annular step extending radially inward from the entrance end of the incineration chamber prevents wall attachment of the hot gases emanating from the burner. With the above arrangement, the combustion of the aerosol stream from the annular atomizer may be substantially completed before it becomes mixed with the centrally flowing aerosol from the conventional atomizer. This is particularly important when the lower viscosity liquid waste fraction is a watery waste having relatively low fuel value such that a burner flame would be quenched if the atomized watery waste were injected directly into the base of the flame.

Although the primary purpose of the teachings herein is the incineration of liquid waste, it is to be understood that the teachings are also applicable to the combustion of liquid fuels other than fuels containing waste material. For example, Bunker fuel could be substituted for the oily waste fraction and a light grade of fuel oil substituted for the watery waste fraction.

It is a general object of this invention to produce a simple and efficient liquid waste incinerator which is capable of economically incinerating a wide variety of fluid wastes including waste gases without altering its structure, but by merely changing the operating procedures.

It is still another object of this invention to produce an incinerator for non-homogeneous liquid waste with improved flame stability.

It is another object of this invention to produce an incinerator for nonhomogeneous liquid waste which uses the heating value of the waste more effectively by dividing the liquid waste into at least two fractions and injecting them separately by a burner means into a reaction chamber.

It is a more specific object of this invention to produce such an incinerator having an annular atomizer which is capable of passing relatively large solid particles without clogging.

These objects and other objects and advantages, as well as the manner of attaining them, will be apparent from the following description made with reference to the accompanying drawings.

DETAILED DESCRIPTION OF THE DRAWINGS

Figure 1:
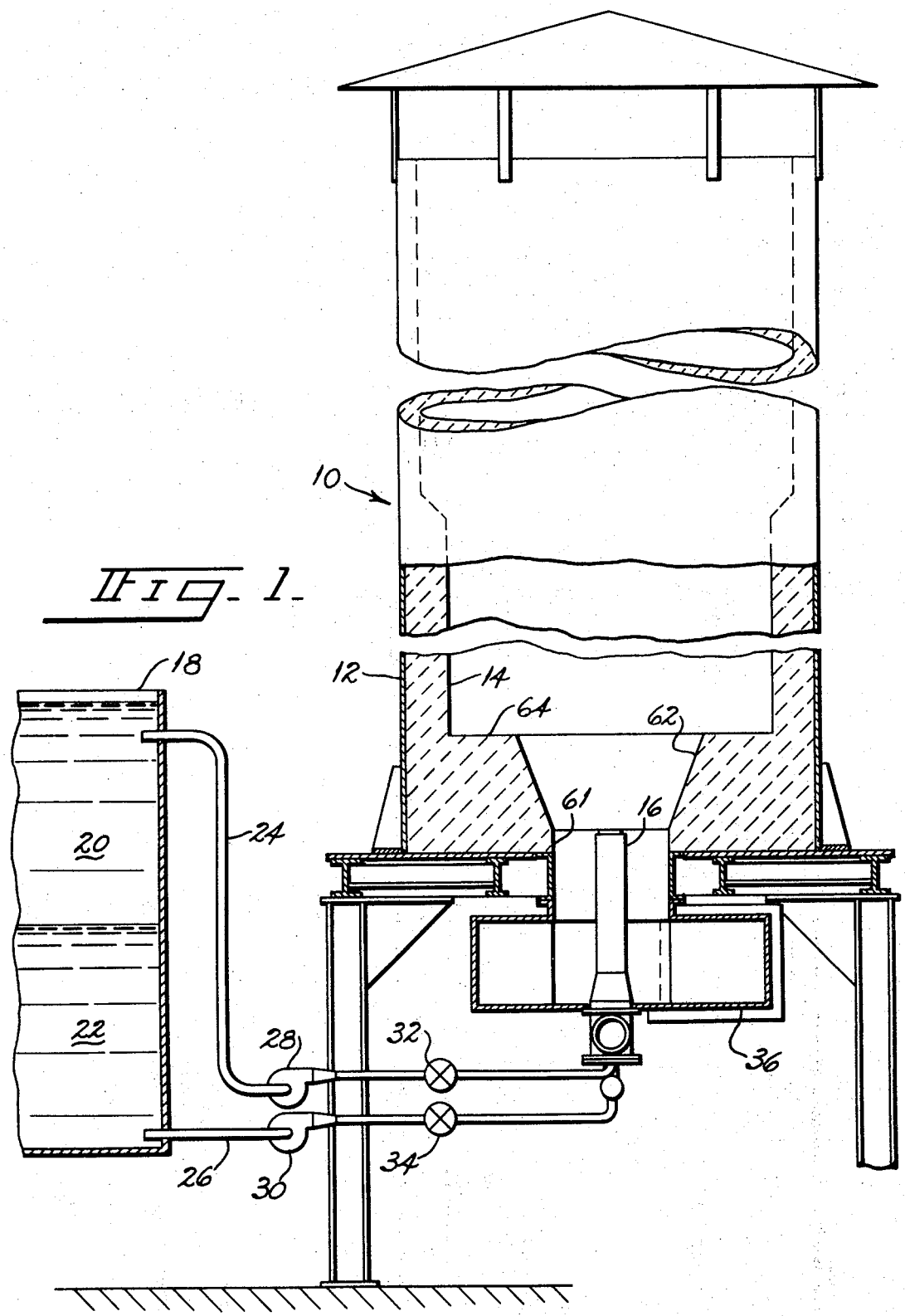
FIG. 1 is a vertical sectional view of the incinerator and separating tank with parts broken away.
Figure 2:
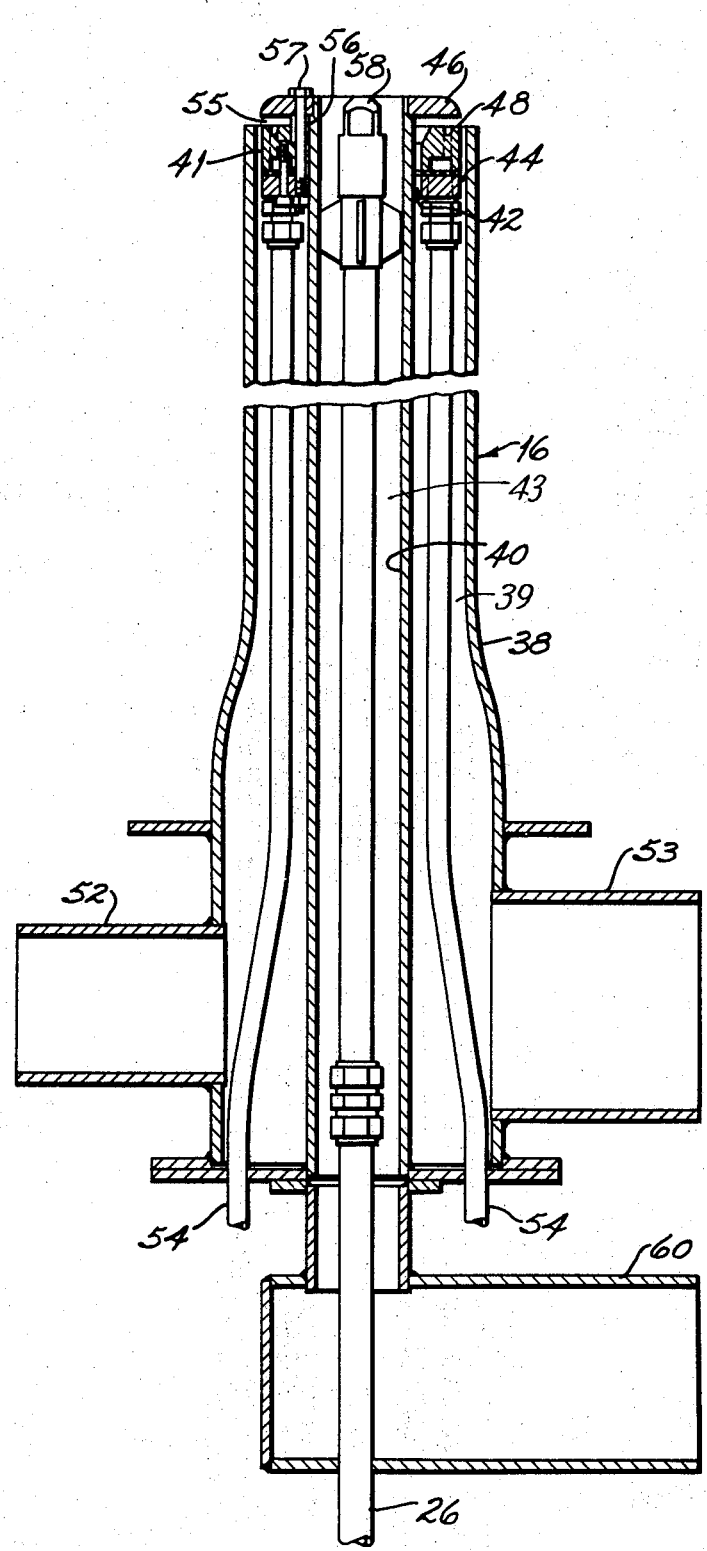
FIG. 2 is an enlarged vertical sectional view of the liquid waste injector.

Referring to the drawings, FIG. 1 shows an incinerator 10 for nonhomogeneous pumpable liquid wastes. It has a vertically disposed cylindrical incineration chamber 12 with a refractory lining 14. At the bottom or entrance end of the chamber 12, an injector 16 is provided to produce separate coaxial aerosol streams from two waste liquid fractions. Alongside the chamber is a liquid waste separator 18, such as a settling tank, for separating the waste liquid into an oily or high viscosity fraction 20 and a watery or low viscosity fraction 22. The oily waste fraction containing a higher amount of combustible material is fed from the top of the separator 18 to the injector 16 through a supply line 24. The watery waste fraction containing a lower amount of combustible material is conveyed to the injector from the bottom of the separator through supply line 26. Variable speed pumps 28 and 30 and valves 32 and 34 may be provided to separately control the pressures and flow rates of the fluids in the lines 24 and 26. A windbox 36 with a centrifugal blower and spin vanes is mounted around the injector to supply a helically swirling column of combustion air around the aerosol streams emanating from the injector. Waste gases or fumes having a sufficiently high oxygen content may be substituted for the combustion air.

The injector 16 is concentrically mounted on the entrance end of the incinerator chamber 12 with an annular space between the outside of the injector and the inside wall of the chamber entrance. It comprises a tubular casing 38 having an enlarged base portion at one end and a nozzle portion of reduced size at the other end. A first annular conduit is formed between the inside wall of the casing and the outside wall of a first tubular member 40 concentrically mounted inside casing. Inside the nozzle end of this conduit is an annular head 41 with an annular outlet orifice in its top side. The head is designed to provide passageways 42 and 44 for a mixture of gaseous fuel and air to flow in an axial direction on both sides of the head between it and the walls of the casing and first tubular member. A flat annular disk 46 spaced above the top side of the head extends radially from the edge of the first tubular member beyond the outlet orifice in the head to the outer edge of the head. The annular surface portion 48 extending from the outlet orifice to the outer edge of the head preferably is a flat surface parallel to the adjacent The oily of the disk 46. However, it may be slightly inclined or arcuate, provided the angle between it and the axially disposed passageway 44 is abrupt, i.e., preferably within 10° or so of 90°. With this arrangement a mixture of gaseous fuel and air is supplied under pressure to the annular conduit through separate input pipes 52 and 53 respectively. It flows at a high velocity through passageway 42 along the periphery of tubular member 40, then radially outward between the top side of the head and the bottom side of the annular disk. Theily fraction of the liquid waste, which is supplied under pressure through branch lines 54 of supply line 24 to the annular outlet orifice, is driven radially outward in a thin film over surface portion 48 to the edge of the head 41 where it is struck by the gaseous stream flowing in a generally perpendicular direction through passageway 44. Thus the thin film is broken into fine droplets which are readily combined with the two turbulent streams of gaseous mixture between which it is sandwiched as it leaves the annular atomizing nozzle through annular gap 55. Preferably a means is provided for adjusting the conical angle of the aerosol stream flowing from the annular nozzle. Various means may be used to accomplish this purpose. For example, one means comprises sleeve spacers 56 disposed between the head 41 and cap 46 of the annular nozzle. Bolts 57 disposed in a circle extend in axial directions through the components and draw them tightly together. By changing the length of the spacers 56 the width of the gap 55 may be varied. This produces a change of momentum of the gaseous stream flowing through passageway 42 and gap 55 with a consequent change in the relative deflection between it and the angularly opposed gaseous stream flowing out of passageway 44.

A watery waste atomizer head 58 of a conventional type is located at the end of supply line 26 which extends along the axis of the injector inside tubular member 40 forming a second annular conduit therewith. The tip of the atomizing head 58 is located within a distance equivalent to one-half the inside diameter of tubular member 40 from the end of tubular member 40 and has a spray angle of between 15°–30°. Air which may be combined with gaseous fuel is supplied under a pressure of more than about 3 pounds per square inch gauge to the second annular conduit through input pipe 60 to produce a high momentum annular gas stream between atomizing head 58 and the surrounding annular atomizer.

The burner chamber portion of the incineration chamber begins with a cylindrical section 61 concentrically surrounding the base end of the injector. Following the cylindrical section is a coaxially aligned truncated conical section 62 which terminates with annular step or ledge 64 extending outwardly from the large end of the cone to the wall of the incineration chamber. The cone has an included angle of less than 70° and a length approximately equal to the radius of its large or upper end. The width of the ledge must be sufficient to prevent premature attachment of the flames or hot reaction products to the wall of the refractory chamber. Preferably the ledge width is greater than the radius of the small end of the cone.

Figure 3:
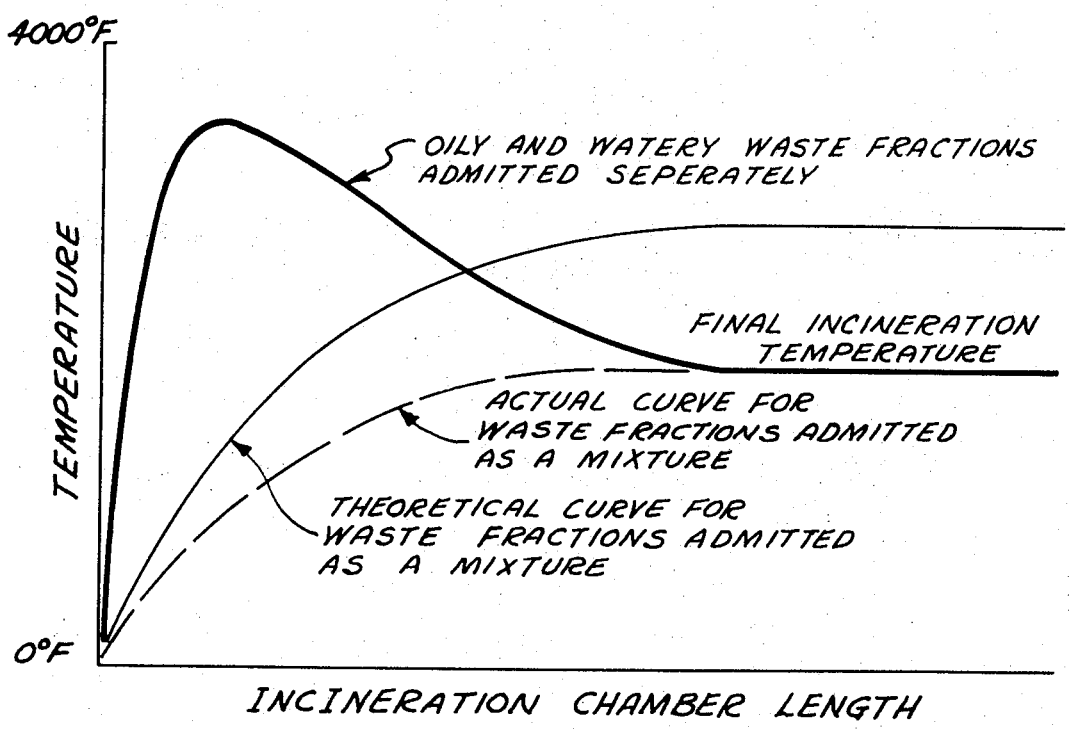
FIG. 3 is a graph comparing the temperature distribution between the incineration system of this invention and a similar incineration system in which the waste liquid fractions are admitted together as a mixture.

This system promotes rapid and substantially complete combustion of the oily waste fraction at a high temperature before the tempering effect of watery waste fraction influences the reaction. The efficiency of this system, wherein the waste fractions are admitted separately, over one in which the waste fractions are admitted as a mixture, is graphically shown in FIG. 3. The theoretical temperature curve in this figure is not attainable as a practical matter because a liquid waste containing the usual amounts of water, even though homogeneously mixed with the combustible components, requires extra fuel in order to maintain a stable flame.

While the principles of this invention are described with reference to a preferred embodiment illustrated in the drawings, it is to be understood that the description is made by way of example and that the scope of the invention is to be limited only as defined in the appended claims.

What is claimed is:

1. A burner for burning pumpable non-homogeneous liquid having fractions with different combustion characteristics, the combination comprising: an annular atomizing means; a second atomizing means coaxially mounted inside said annular atomizing means; means for separating the liquid into two fractions, one of said fractions having a higher fuel value than the other of said fractions; means for supplying said higher fuel value fraction to said annular atomizer; and means for supplying the other of said fractions to said second atomizer.

2. A burner according to claim 1 wherein wall means defining an annular conduit is disposed about said second atomizing means, said annular atomizer includes an annular head adjacent the outlet end of said annular conduit, said head being spaced laterally from the sides of said conduit to form passages therebetween, an annular utlet groove located in said head, an annular disc spaced above said head and extending from the inside wall of said conduit to adjacent its outside wall, means for directing a first high velocity gas stream across the open face of said groove, annular lip means extending from said groove in the direction of said stream, means for directing a second high velocity gas stream across the outer edge of said lip means at an abrupt angle with respect to said first gas stream.

3. A burner according to claim 2 including a means for varying the relative momentum of gas streams emitting from said atomizing means whereby the resultant direction of the streams is changed.

4. A burner according to claim 1 further including an annular conduit for supplying a high momentum annular gas stream between said two atomizing means.

* * * * *

UNITED STATES PATENT OFFICE
CERTIFICATE OF CORRECTION

Patent No. 3,768,961    Dated October 30, 1973

Inventor(s) Klaus H. Hemsath and Dale E. Wright

It is certified that error appears in the above-identified patent and that said Letters Patent are hereby corrected as shown below:

Column 1, line 30, delete "if" and substitute therefor -- it --.

Column 3, lines 48-49, delete "The oily" and substitute therefor -- side --. Line 58, delete "Theily" and substitute therefor -- The oily --.

Column 4, line 34, change "concical" to -- conical --.

Column 5, line 13, change "nularutlet" to -- nular outlet --.

Signed and sealed this 9th day of April 1974.

(SEAL)
Attest:

EDWARD M. FLETCHER, JR.
Attesting Officer

C. MARSHALL DANN
Commissioner of Patents